(12) United States Patent
Rinde et al.

(10) Patent No.: US 6,254,105 B1
(45) Date of Patent: Jul. 3, 2001

(54) SEALING SYSTEM FOR ACOUSTIC WAVE TOUCHSCREENS

(75) Inventors: James A. Rinde; Barry C. Mathews; Miguel A. Morales; Joel C. Kent, all of Fremont; Drew John Loucks, Los Altos; John Seymour Mattis, Sunnyvale; Jeff Dolin, Belmont; Mark W. Ellsworth, Dublin; Frank Wasilewski, Redwood City, all of CA (US)

(73) Assignee: Elo TouchSystems, Inc., Fremont, CA (US)

( * ) Notice: Subject to any disclaimer, the term of this patent is extended or adjusted under 35 U.S.C. 154(b) by 0 days.

(21) Appl. No.: 09/285,407

(22) Filed: Apr. 2, 1999

(51) Int. Cl.[7] ................................................. F16J 15/02
(52) U.S. Cl. ........................ 277/628; 277/639; 277/650; 345/177
(58) Field of Search .................................. 277/628, 637, 277/639, 650; 345/177; 178/18; 359/513

(56) References Cited

U.S. PATENT DOCUMENTS

| | | |
|---|---|---|
| Re. 33,151 | 1/1990 | Adler . |
| 3,020,260 | 2/1962 | Nelson . |
| 4,600,261 | 7/1986 | Debbaut . |
| 4,634,207 | 1/1987 | Debbaut . |
| 4,642,423 | 2/1987 | Adler . |
| 4,644,100 | 2/1987 | Brenner et al. . |
| 4,645,870 | 2/1987 | Adler . |
| 4,700,176 | 10/1987 | Adler . |
| 4,746,914 | 5/1988 | Adler . |
| 4,777,063 | 10/1988 | Dubrow et al. . |
| 4,791,416 | 12/1988 | Adler . |
| 4,816,811 | 3/1989 | Bogatin et al. . |
| 4,825,212 | 4/1989 | Adler et al. . |
| 4,859,996 | 8/1989 | Adler et al. . |
| 4,861,804 | * 8/1989 | Nakanishi . |
| 4,880,665 | 11/1989 | Adler et al. . |
| 5,005,329 | * 4/1991 | Schorr . |
| 5,042,821 | * 8/1991 | Bontly . |
| 5,072,427 | 12/1991 | Knowles . |
| 5,079,300 | 1/1992 | Dubrow et al. . |
| 5,162,618 | 11/1992 | Knowles . |
| 5,177,327 | 1/1993 | Knowles . |
| 5,243,148 | 9/1993 | Knowles . |
| 5,260,521 | 11/1993 | Knowles . |
| 5,329,070 | 7/1994 | Knowles . |
| 5,332,238 | 7/1994 | Borucki . |
| 5,357,057 | 10/1994 | Debbaut . |
| 5,573,077 | 11/1996 | Knowles . |
| 5,591,945 | 1/1997 | Kent . |
| 5,665,809 | 9/1997 | Wojtowicz . |
| 5,708,461 | 1/1998 | Kent . |
| 5,739,479 | 4/1998 | Davis-Cannon et al. . |
| 5,784,054 | 7/1998 | Armstrong et al. . |
| 5,852,433 | 12/1998 | Toda . |
| 5,854,450 | 12/1998 | Kent . |

FOREIGN PATENT DOCUMENTS

| | | |
|---|---|---|
| 0 740 264 A2 | 10/1996 | (EP) . |
| WO 98/52184 | 11/1998 | (WO) . |

* cited by examiner

Primary Examiner—Lynne H. Browne
Assistant Examiner—William L. Miller

(57) ABSTRACT

A sealing system for an acoustic touchscreen includes an elongate gel body between the touchscreen and the bezel of a housing onto which the touchscreen is mounted. The elongate gel body forms a seal around the perimeter of the touch-sensitive area of the touchscreen. A stop element controls and limits the amount of compression of the elongate gel body. The resulting seal is highly effective in protecting the unexposed parts of the touchscreen (i.e., areas other than the touch-sensitive area) from contaminants, especially liquid contaminants, at the cost of an acceptably low loss in acoustic signal strength.

22 Claims, 4 Drawing Sheets

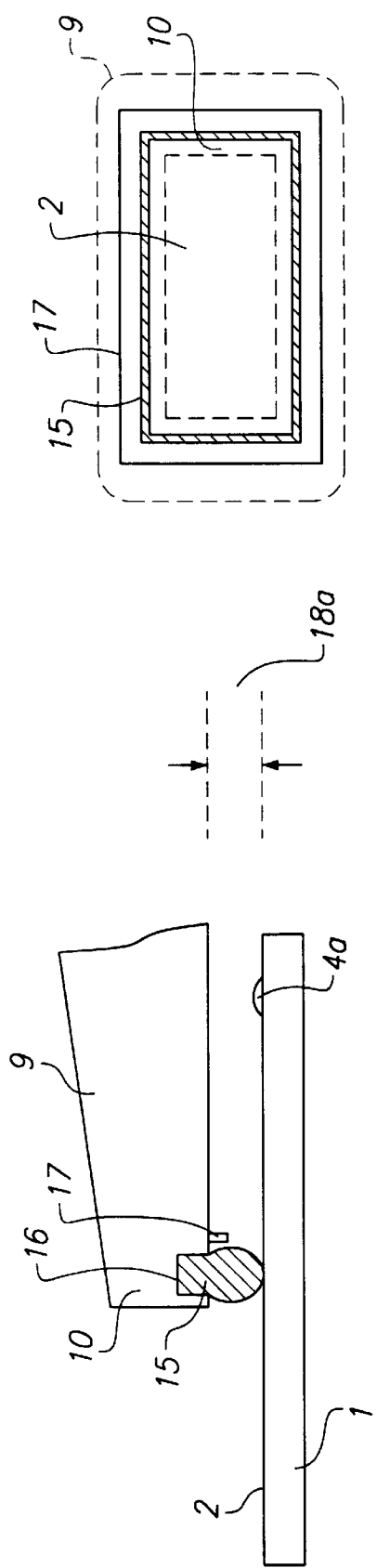
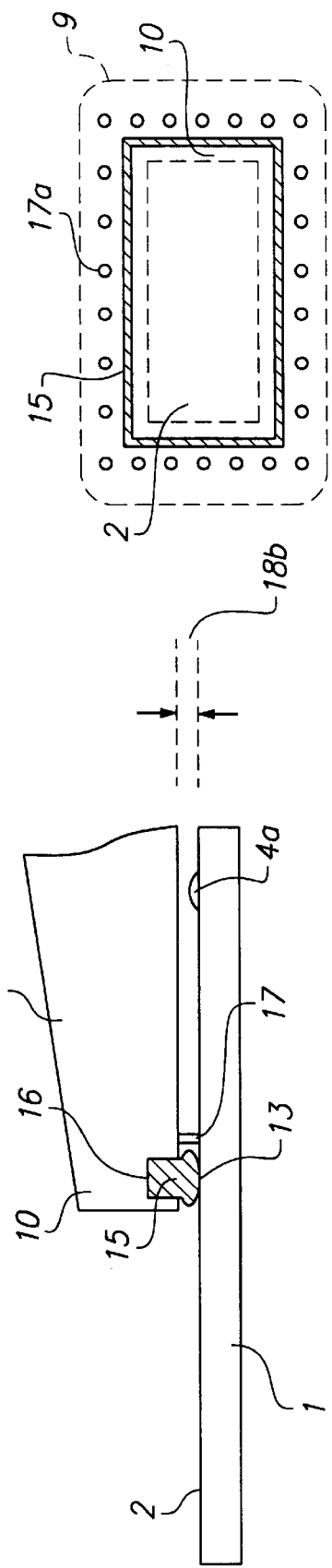

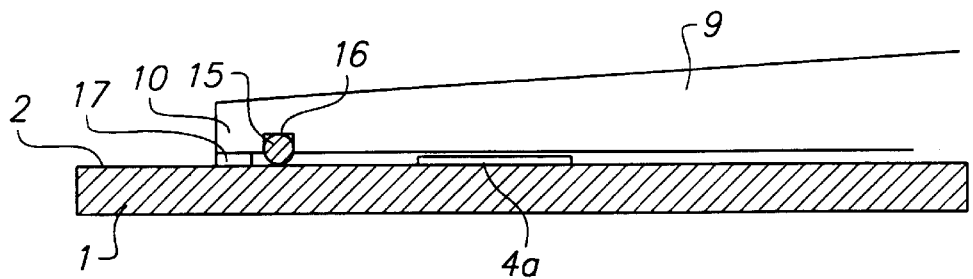
FIG. 3C
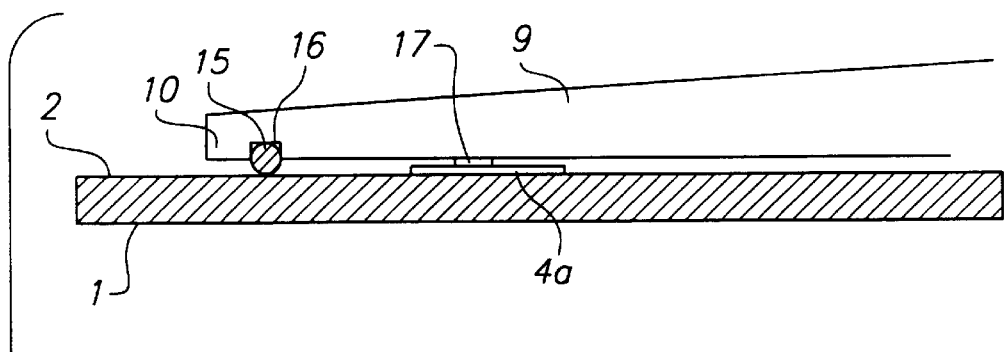
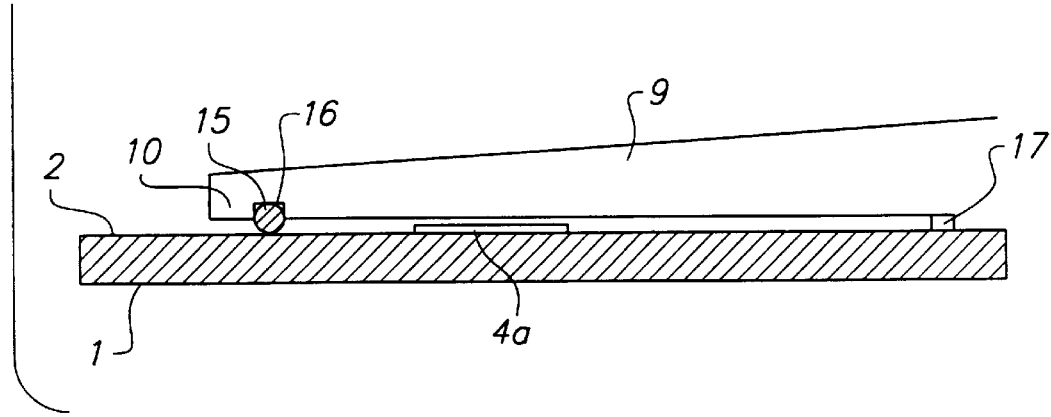
FIG. 3D

SEALING SYSTEM FOR ACOUSTIC WAVE TOUCHSCREENS

BACKGROUND OF THE INVENTION

1. Field of the Invention

This invention relates to a sealing system for acoustic wave touchscreens, for protecting components outside of the touch-sensitive area from contaminants.

2. Description of Related Art

An acoustic touchscreen has a touch-sensitive area on which the occurrence and location of a touch is sensed via the touch's effect on the transmission of acoustic waves thereacross. A common type of acoustic touchscreen employs Rayleigh waves (a term which, as used herein, subsumes quasi-Rayleigh waves). Illustrative disclosures relating to Rayleigh wave touchscreens include Adler, U.S. Pat. No. 4,642,423 (1987); U.S. Pat. No. 4,645,870 (1987); U.S. Pat. No 4,700,176 (1987); U.S. Pat. No. 4,746,914 (1988); U.S. Pat. No. 4,791,416 (1988); and Re 33,151 (1990); Adler et al., U.S. Pat. No. 4,825,212 (1989); U.S. Pat. No. 4,859,996 (1989); and U.S. Pat. No. 4,880,665 (1989); Brenner et al., U.S. Pat. No. 4,644,100 (1987); Davis-Cannon et al., U.S. Pat. No. 5,739,479 (1998); and Kent, U.S. Pat. No. 5,708,461 (1998) and U.S. Pat. No. 5,854,450 (1998). Acoustic touchscreens employing other types of acoustic waves such as Lamb or shear waves, or combinations of different types acoustic waves (including combinations involving Rayleigh waves) are also known, illustrative disclosures including Kent, U.S. Pat. No. 5,591,945 (1997) and U.S. Pat. No. 5,854,450 (1998); Knowles, U.S. Pat. No. 5,072,427 (1991); U.S. Pat. No. 5,162,618 (1992); U.S. Pat. No. 5,177,327 (1993); U.S. Pat. No. 5,243,148 (1993); U.S. Pat. No. 5,329,070 (1994); and U.S. Pat. No. 5,573,077; and Knowles et al., U.S. Pat. No. 5,260,521 (1993). The documents cited in this paragraph are incorporated herein by reference.

FIG. 1 illustrates the operation of a typical acoustic touchscreen 1, having an active, or touch-sensitive area 2. A first transmitting transducer 3a is positioned outside of touch-sensitive area 2, acoustically coupled to the surface of touchscreen 1, and sends an acoustic signal in the form of an acoustic wave 11a traveling parallel to the top edge of touchscreen 1 and generally in the plane of touchscreen 1. Aligned in the transmission path of acoustic wave 11a is a linear array of partially acoustically reflective elements 4a, each of which partially reflects (by approximately 90°) and partially transmits the acoustic signals, creating a plurality of acoustic waves (exemplarily 5a, 5b, and 5c) traveling vertically (parallel to the Y-axis) across touch-sensitive area 2. (The spacing of reflective elements 4a is variable to compensate for the attenuation of the acoustic signals with increasing distance from first transmitter 3a ) Acoustic waves 5a, 5b, and 5c, upon reaching the lower edge of touchscreen 1, are again reflected by approximately 90° (arrow 11b) by another linear array of similarly partially acoustically reflective elements 4b towards a first receiving transducer 6a, where they are detected and converted to electrical signals for data processing. Along the left and right edges of touchscreen 1 are located a similar arrangement. A second transmitting transducer 3b generates an acoustic wave 12a along the left edge, and a linear array of partially acoustically reflective elements 4c creates therefrom a plurality of acoustic waves (exemplarily 7a, 7b, and 7c) traveling horizontally parallel to the X-axis) across touch-sensitive area 2. Acoustic waves 7a, 7b, and 7c are redirected (arrow 12b) by yet another linear array of partially acoustically reflective elements 4d towards receiving transducer 6b, where they are also detected and converted to electrical signals.

If touch-sensitive area 2 is touched at position 8 by an object such as a finger or a stylus, some of the energy of the acoustic waves 5b and 7a is absorbed by the touching object. The resulting attenuation is detected by receiving transducers 6a and 6b as a perturbation in the acoustic signal. Analysis of the data with the aid of a microprocessor (not shown) allows determination of the coordinates of position 8.

Touchscreen 1 may be either a separate plate (typically made of glass, but other hard substrates may be used) mounted over a display panel such as a cathode ray tube (CRT), a liquid crystal display (LCD), plasma, electroluminescent, or other type of display. Alternatively touchscreen 1 may be constructed directly on the face of the display panel (e.g., CRT or plasma) itself In normal usage a housing 9 (outline indicated by a dotted line in FIG. 1), typically made of molded polymer, is associated with touchscreen 1. Housing 9 contains a bezel 10 (outline also indicated by a dotted line in FIG. 1) that overlays touchscreen 1, concealing the transmitting and receiving transducers, the reflective elements, and other components, but exposing touch-sensitive area 2. This arrangement protects the concealed components from contamination and/or damage, presents a more aesthetically pleasing appearance, and defines the touch-sensitive area for the user.

Bezel 10 may be spaced apart from touchscreen 1. In an abutted configuration bezel 10 attenuates the acoustic signals, reducing the touchscreen's responsiveness. However, a spaced-apart bezel 10 leaves a gap through which contaminants (such as dirt, dust, and, especially, liquids) may enter and damage or interfere with the function of the concealed components. Acoustic touchscreens intended for operation in outdoor environments or in facilities such as restaurants or factories, where exposure to rain, fog, spills, sprays, or cleaning solutions is a likelihood, are especially vulnerable in this regard.

Theoretically, one can form a liquid-impermeable seal by applying a caulking between bezel 10 and touchscreen 1 around the perimeter of active area 2, but the caulking will absorb acoustic energy, interfering with touchscreen operation. Rayleigh wave touchscreens, because of the surface-propagating nature of their acoustic waves, are especially likely to be adversely affected. Borucki, U.S. Pat. No. 5,332,238 (1994) (hereinafter the "Borucki patent," incorporated by reference) states that a caulking will not only absorb significant amounts of acoustic energy so as to render the touchscreen inoperable, but also acoustically couple the screen and can cause a false touch to be registered around the entire perimeter of the screen.

The Borucki patent's solution to the sealing problems to employ a foam strip compressed between the bezel/housing and the touchscreen. Acoustic attenuation is limited to an acceptable level by placing an open-cell surface of the foam against the touchscreen or by restricting contact with the touchscreen to a comer of the foam.

An alternative sealing arrangement is disclosed in Armstrong et al., U.S. Pat. No. 5,784,054 (1998) ("Armstrong patent," incorporated herein by reference), in which a sealing strip made of closed cell foam (or, alternatively, expanded polytetrafluoroethylene) is preferably adhesively affixed to the bezel.

Whatever the sealing system, it is operationally desirable to limit acoustic signal loss attributable to the sealant to less than −6 dB.

A disadvantage of the aforementioned foam sealants is that they rely entirely on compressive forces to hold the sealant in contact with the touchscreen surface. In the case of vibration or loosening of the brackets holding the housing and the touchscreen together, there may be a momentary or permanent increase in the gap between the bezel and the touchscreen, compromising the integrity of the seal. Another limitation of foams is that they may permit the passage of liquids into the protected areas of the touchscreen by a wicking or capillary action. Yet another limitation of such seals is that in order to be effective, the foam strip must be relatively wide, on the order of about 4 mm. This extra width reduces the size of the active area of a touchscreen in comparison to the bezel-covered, or inactive areas of the touchscreen. Also, for a given sealant composition, increased width means increased acoustic absorption, making a narrower seal design more desirable. Thus, it is desirable to develop a sealing system for acoustic touchscreens overcoming one or more of the aforementioned limitations.

BRIEF SUMMARY OF THE INVENTION

We have discovered an improved sealing system for acoustic touchscreens based on a gel material. In one aspect of the invention, there is provided an acoustic touchscreen arrangement having a seal around the touch-sensitive area of the touchscreen, comprising:

(a) an acoustic touchscreen having a touch-sensitive area;

(b) a housing mounted on the touchscreen, the housing including a bezel located above the touchscreen and around the perimeter of the touch-sensitive area;

(c) an elongate gel body compressed between the bezel and the touchscreen and forming a seal therebetween around the perimeter of the touch-sensitive area;

(d) retention means for assisting in the positioning and the holding in place of the elongate gel body; and (e) a stop means for limiting the amount of compression of the elongate gel body.

In another aspect of the invention, there is provided a method of sealing an acoustic touchscreen, comprising the steps of (a) providing a touchscreen having a touch-sensitive area;

(b) mounting a housing having a bezel onto the touchscreen, such that the bezel is located above the touchscreen and around the perimeter of the touch-sensitive area; and (c) positioning an elongate gel body between the bezel and the touchscreen around the perimeter of the touch-sensitive area such that the elongate gel body is compressed between the bezel and the touchscreen and forms a seal therebetween, the amount of compression of the elongate gel body being limited by a stop means and the elongate gel body being positioned and held in place with the assistance of a retention means.

BRIEF DESCRIPTION OF THE DRAWING(S)

FIGS. 2a and 2b show in cross-section a sealing system of this invention.

FIGS. 3a and 3b show overhead views of sealing systems of this invention.

FIGS. 3c, 3d and 3e show alternative positionings of the stop means.

Figure 1:
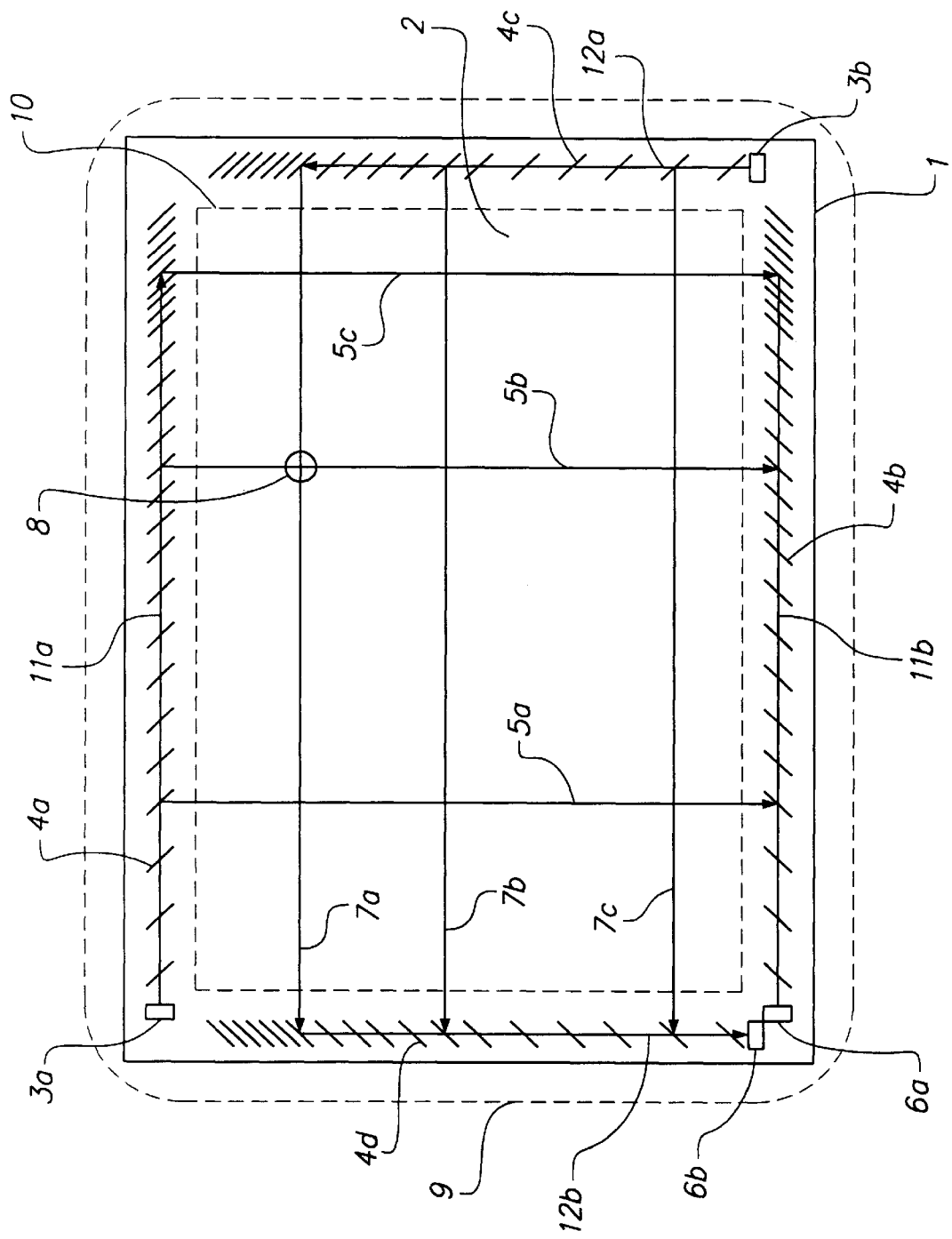
FIG. 1 depicts a touchscreen of the type with which the present invention may advantageously be used.
Figure 4:
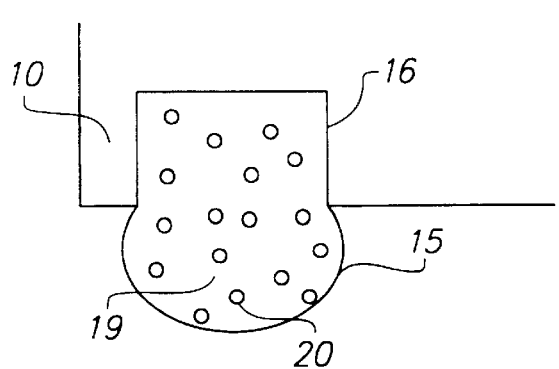
Figure 5:
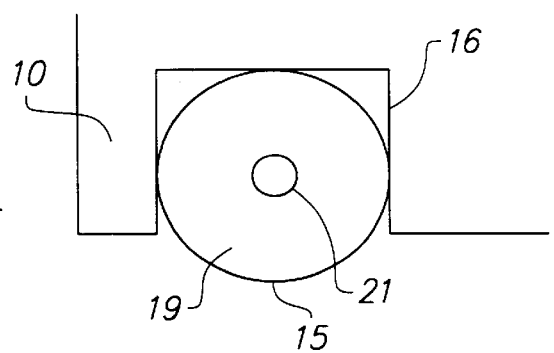
Figure 6:
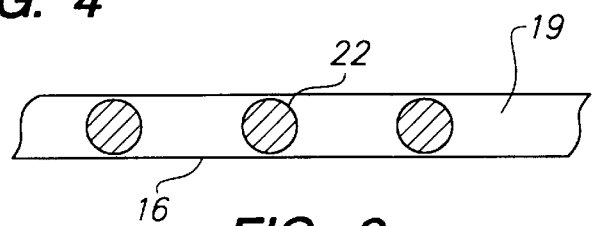

FIGS. 4, 5, and 6 show various embodiments of a gel body used in a seal of this invention.

Figure 7A:
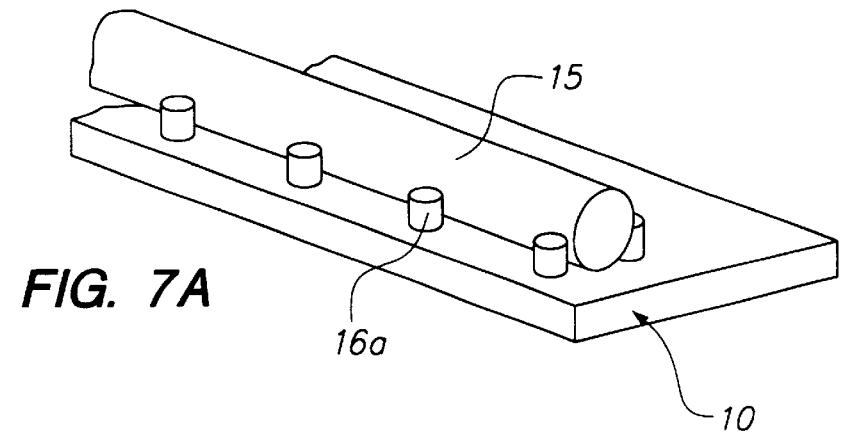
Figure 7B:
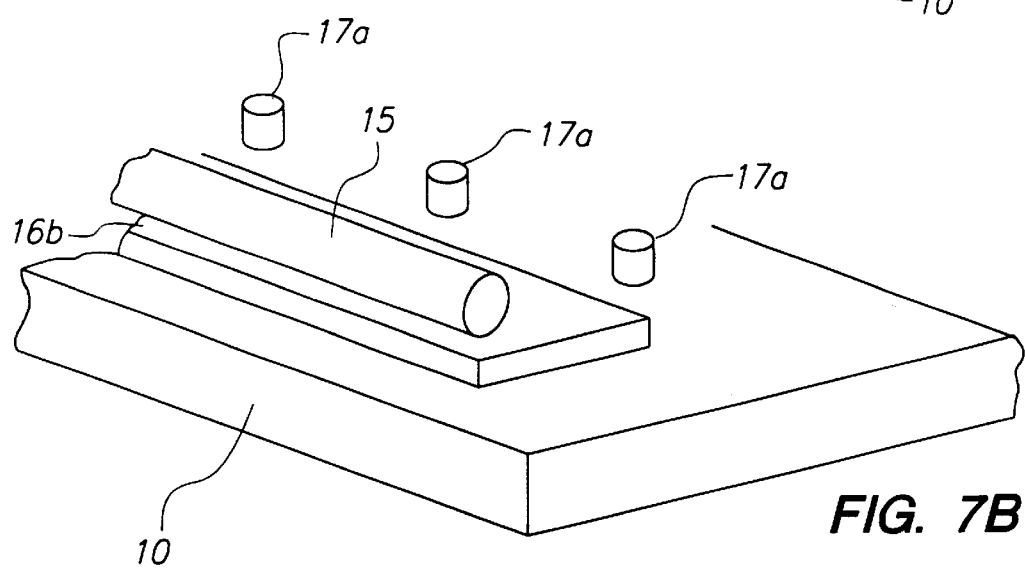

FIGS. 7a and 7b show additional embodiments of the invention.

Herein, reference numerals repeated from one figure to another denote the same or equivalent elements.

DETAILED DESCRIPTION OF THE INVENTION

The sealing system of this invention is shown in cross-sectional views in FIGS. 2a and 2b. In FIG. 2a, a housing 10 including a bezel 9 is positioned over touchscreen 1, with the bezel leaving exposed (uncovered) touch-sensitive area 2 of touchscreen 1. A retention means 16, shown in this embodiment as groove or channel on the underside of bezel 10 (the side facing touchscreen 1) helps hold in place and helps position an elongate gel body 15. Gel body 15 is just touching touchscreen 1, but is not yet under any compression in the depiction of FIG. 2a, the separation between bezel 10 and touchscreen 1 being represented by gap 18a In FIG. 2b a seal 13 has been formed, gel body 15 being compressed against touchscreen 1. The separation between touchscreen 1 and bezel 10 is now reduced, and is represented by a smaller gap 18b. An advantage of the present sealing system is the bulging-out of gel body 15 towards touch-sensitive area 2 (FIG. 2b ), reducing the amount of space underneath bezel 10 where liquid may become entrapped (compare against FIG. 5 in the Borucki patent). It is understood that the reference numeral 4a has been used to identify the acoustically reflective element for convenience, but that reference numerals 4b, 4c, or 4d could just as well have been used.

Retention means 16, in the instantly depicted form of a groove, has typical dimensions of about 0.81 mm (0.032 inch) wide by 0.51 to 1.9 mm (0.020 to 0.075 inch) deep. The width of seal 13 is preferably less than 2 mm, more preferable 1 mm or less, based on gel body 15 in its compressed state (FIG. 2b).

Retention means 16 is preferably located in the housing itself, for example, integral therewith as a single molded part. Proper alignment of gel body 15 vis-à-vis the bezel is especially important for avoiding water traps and having retention means 16 located in the housing is advantageous in this regard. But this invention is not so limited, and retention means 16 may be located on the touchscreen or may be a separately provided component, apart from either the touchscreen or the housing.

While some compression of gel body 15 is needed to ensure formation of a good seal, overcompression is undesirable because the gel body is squeezed outwards too much, resulting in a seal that is too wide and has an unacceptable level of acoustic energy loss. Stop means 17 functions to restrict the amount of compression that may be applied to gel body 15. Typically stop means 17 sets a minimum value of gap 18b at about 0.5 mm. Preferably, the compression ratio of gel body 15, as measured by the ratio 18b/18a, is between 5 and 80%, more preferably between about 30 and about 70%.

Variations in seal compression can induce a corresponding variation in the acoustic absorption caused by seal 13 itself and, hence, fluctuations in signal strength. Such fluctuations can confuse the signal processing electronics, leading to either unresponsiveness or the registration of false touches. By limiting the amount of compression, stop means 17 offers the additional benefit of reducing signal variability.

Stop means 17 can be a continuous strip of material on the underside of bezel 10. Its cross-sectional profile may be rectangular as shown in FIGS. 2a and 2b, or it may have some other profile, such as delta or trapezoid shaped. The particular shape is not critical, subject to the general design consideration that stop means 17 should not cause an unacceptable amount of acoustic energy loss. Where possible, it is preferable to place stop means 17 in an acoustically inactive area of touchscreen 1. Alternatively, stop means 17 need not be a continuous element, but can instead be a series of projections or pegs on the underside of bezel 10. In another variation, stop means 17 can be a set of spacers external to the bezel increasing the space between the bezel and the touchscreen.

FIGS. 3a and 3b show overhead views of sealing systems of this invention. Bezel 10 covers the touchscreen concealing components such as transducers and acoustic reflectors (not shown), but exposing touch-sensitive area 2. Surrounding the perimeter of touch-sensitive area 2 is elongate gel body 15 (which may be constituted of one single continuous piece or may be a combination of two or more pieces), forming a seal that prevents contaminants (especially liquids) from entering underneath bezel 10 and damaging or interfering with components concealed thereunder. Stop means 17, represented here as a continuous element, limits the amount of compression that may be applied to gel body 15. FIG. 3b shows an alternative embodiment, in which, instead of a continuous stop element 17, the same stop function is achieved by a series of individual pegs or projections 17a.

Stop means 17 may be positioned close to seal 13, as shown in FIG. 2b. This arrangement reduces the need for the bezel to be a strong cantilever and makes stop means 17 more effective at limiting compression. Instead of being inside seal 13, as shown in FIG. 2b, stop means 17 may be positioned outside of seal 13, as shown in FIG. 3c. Yet further alternative positionings of stop means 17 are shown in FIG. 3d (stop means 17 interspersed among reflective elements) and FIG. 3e (stop means positioned behind reflective elements). This latter design is desirable in respect of eliminating signal strength loss due to absorption of acoustic energy by stop means 17, but at a trade-off of increasing mechanical cantilever flexing of the bezel.

Gel body 15 may be based on silicone (also known as polysiloxane or organopolysiloxane), polyurethane, polyurea, an anhydride-containing polymer, styrene-ethylene butylene-styrene (SEBS) block polymer, or styrene-ethylene propylene-styrene (SEPS) block copolymer, or other polymer. A high elongation gel is desirable as it affords a sealing system that is more forgiving of manufacturing variations in the gap between the touchscreen and the bezel, or where such gap is changed, either temporarily or permanently, by post-manufacturing events such as jarring during shipment, loosening of mounting brackets with time, or abuse by a user. Tackiness is also a desirable characteristic of the gel body because a modicum of adhesion ensures the formation of a better seal. Yet, because the adhesive bond is not a permanent bond, disassembly of the housing from the touchscreen for repair or maintenance is possible, with easy re-assembly and reformation of the seal. A like consideration applies where momentary disbonding of the gel from either the touchscreen or the bezel occurs, for example due to accidental impact—the seal can reform readily. Yet another advantage of the instant gel-based sealing system is that a gel, not being microporous, does not permit liquid to pass through by capillary action.

Preferably, gel body 15 comprises crosslinked silicone gel, more preferably a silicone gel based on polydimethyl-siloxane (PDMS) and prepared by the platinum-catalyzed reaction between a vinyl-functionalized PDMS and a hydride-functionalized PDMS. Such gels can be formed in a number of ways. One method synthesizes the crosslinked polymer in the presence of a non-reactive extender fluid, e.g. trimethylsiloxy-terminated PDMS. An alternative method fabricates the silicone gel by reacting a stoichiometric excess of a multifunctional vinyl-substituted silicone with a multifunctional hydride-substituted silicone in such a fashion that a soft, fluid-extended system is obtained. In the latter approach, a vinyl-rich sol fraction is obtained. Combination systems are possible. Suitable examples of either of these gel systems are taught in, inter alia, Debbault, U.S. Pat. No. 4,600,261 (1986); Debbault, U.S. Pat. No. 4,634,207 (1987); Debbault, U.S. Pat. No. 5,357,057 (1994); Dubrow et al., U.S. Pat. No. 5,079,300 (1992); Dubrow et al., U.S. Pat. No. 4,777,063 (1988); and Nelson, U.S. Pat. No. 3,020,260 (1962); all incorporated herein by reference. Silicone gel systems based on alternative cure techniques such as peroxide, UV light, and high energy radiation may also be used. The hydrophobicity of silicone gel makes it preferable over other gels, such as polyurethane gel.

Especially preferred are soft, tough, tacky, high elongation silicone gels that exhibit good stress relaxation and reduced fluid exudation. Exudation of extender fluid from the gel material (also referred to as fluid migration or bleed-out) is undesirable because it contaminates the surrounding environment with a thin liquid film.

A low-exudation silicone gel can be fabricated by the chain extension of a divinyl silicone material in the presence of a cross-linker and a chain extender to create a high molecular weight sol, such that the weight average molecular weight ($M_w$) of the extractable fluid is at least 100,000 g/mol. (The extractable fluid consists of the sol and nonreactive diluent present in the formulation, if any.) The gel material is preferably fabricated with 0 to 40 weight % added inert extender diluent. An alternative synthetic method is to use a diluent with $M_w$ of at least 100,000 g/mol, but then the initial (uncured) viscosity is greater than 50,000 cP, which may make filling the base more difficult. Generally, these silicone gels preferably have a hardness of 10 to 1,000 g (more preferably 10 to 500 g), a tack of 5 to 250 g, an ultimate elongation of greater than 500%, a stress relaxation 20 to 95%.

The gel may be formed in place by placing a gel precursor material in the groove and allowing it to cure. Alternatively, the gel may be a preformed body, for example an extruded profile. The preparation of extruded gel profiles is described in Wojtowicz, U.S. Pat. No. 5,665,809 (1997), the disclosure of which is incorporated by reference. The extruded profile may have any one of a variety of cross-sectional shapes, such as rectangular, trapezoidal, round, or oval.

In a preferred embodiment, the gel body comprises a gel material filled with microspheres, also known as microballoons. Such a material is shown in FIG. 4, in which gel body 15, located within a retention means 16 (groove), comprises a gel material 19 filled with microspheres 20. A microsphere-filled gel has a lower density, from about 0.25 to about 0.5 g/cm$^3$, compared to close to 1 g/cm$^3$ for unfilled gel, with a concomitant reduction in its acoustic absorption. Where used, the microspheres may be present in an amount of about 1 to about 40 weight %, preferably between about 5 and about 15 weight %, based on the combined weights of microspheres and gel material.

By way of illustration, microsphere filled silicone gel may be prepared by adding plastic microspheres in their unexpanded condition, as received from the supplier, to an uncured silicone gel formulation; heating firstly the precursor composition at about 60° C. for 60 min to cure the gel; and heating secondly at 120° C. for 15 min to expand the microspheres. It is especially convenient to place the uncured-gel, unexpanded microsphere mixture in a groove of the bezel and curing and expanding in situ.

Microspheres are available under the tradename Expancel™ from Akzo Nobel (Sweden), in several grades with expansion temperatures ranging from 80 to 150° C. The microspheres may be viewed as spheres filled with isobutane, which causes the microspheres to expand upon heating to the expansion temperature. Generally, the expansion temperature is determined by the composition of the polymer which forms the microsphere walls. The lowest temperature expanding microspheres (grade 820) have a composition of roughly 80% vinylidene chloride and 20% acrylonitrile. An intermediate-temperature grade (551) comprises 50/50 vinylidene chloride and acrylonitrile. A 120° C.-expanding grade (091) contains over 90% acrylonitrile and no vinylidene chloride. Yet another grade (051) expands around 110° C. The particle size of unexpanded microspheres ranges from 3 to 50 μm, with an average diameter of 10 to 17 μm. After expansion, they range in size from 10 to 200 μm, with an average diameter of 50 to 60 μm.

An exemplary silicone gel filled with 10.17 weight % microspheres (corresponding to 67 volume % microspheres after expansion) had a hardness of 500 g, a tensile strength at break of 0.23 MPa (33 psi), an elongation of 500 %, a toughness of 0.98 MPa (143 psi) and a modulus of 0.90 MPa (130 psi). After aging for 12 days at 70° C., the tensile strength was 0.29 MPa (42 psi), the elongation was 367%, the toughness was 0.88 MPa (128 psi), and the modulus remained at 0.90 (130 psi). A sample compressed at 50% for 4 weeks at 60° C. exhibited no oil migration.

Further details on the preparation and expansion of microsphere filled gel materials is found in the copending application of Morales et al., entitled "Method of Expanding a Gel," filed even date herewith [attorney's docket number MP1693-US1.], incorporated herein by reference.

Where the gel body is an extruded profile, it preferably includes a filament core, such as shown in FIG. 5 in a transverse cross-section view. Gel body 15 comprises a gel material 19 having a filament core 21, which may be made of a polymer such as nylon, polyester, and the like and may be monofilament or multifilament. Filament core 21 provides ruggedness for improved handleability during the installation process. Filament core 21 also can serve as an internal stop, for limiting the compression on gel body 15, in which case filament core 21's diameter should be between 0.7 and 0.9 of the total combined diameter of the core plus gel body 15. A filament core design, however, generally does not have as good range-taking capability (accommodation of a wide range of gaps between the bezel and the touchscreen) as the microsphere filled gel embodiment.

Yet another embodiment of gel body 15 is shown in a longitudinal cross-section view in FIG. 6. Gel body 15 comprises a gel material 19 filled with spacer particles 22, which serve as another form of an internal stop means for limiting compression. Spacer particles 22 may be, for example, glass microspheres.

Additional embodiments of the invention are shown in FIGS. 7a and 7b. FIG. 7a shows bezel 10 in a partial, bottom-side up view. The retention means is in the form of a series projections of peg or projections 16a, which serve the dual purpose of positioning and holding elongate gel body 15 (shown here as an extruded profile with circular cross-section) and of acting as a stop means. In FIG. 7b, in which bezel 10 also is shown in a partial, bottom-side up view, the retention means is a double-sided adhesive tape 16a, with a series of pegs or projections 17a acting as the stop means.

The sealing system of this invention is suitable for environmental protection of any acoustic touchscreen, regardless of the type of acoustic wave employed by the touchscreen and regardless of whether it is a curved or flat touchscreen. However, the sealing system is especially advantageously used with Rayleigh wave touchscreens, because of the ease with which their acoustic waves are attenuated. Acoustic touchscreens with which the present invention may be used are described in the patent documents referenced in the Background of the Invention section and have been incorporated herein by reference. The present invention may also be used with other types of touchscreens, such as resistive ones, although resistive touchscreens do not present the same design considerations, such as attenuation of acoustic signals, as acoustic touchscreens.

In comparative tests, we have found that the introduction of a sealing system according to this invention can have an acoustic signal loss of as little as between −3.5 and −1 dB (depending on the individual configuration) compared to a like touchscreen-housing combination without the sealing system. Such a loss is below the target of less than about −6 dB.

The making and using of our invention is exemplified by the following examples, which are provided for the purposes of illustration, and not of limitation.

EXAMPLE 1

In this example, a seal was formed using an elongate silicone gel body having a filament core, such as shown in FIG. 5. The groove dimensions were 0.8 mm×0.8 mm. The gel body had an overall diameter of 1.0 mm while the filament core had a diameter of 0.25 mm. A single piece of filament core gel was used, in a sufficient length to seal the perimeter of a touchscreen, with the seam between the ends being located at the top of the touchscreen. Performance results are provided in Table I below. The results show that this particular design effectively sealed a bezel-to-touchscreen gap of between about 5 to about 12 mils (below 5 mils, there was water leakage; above 12 mils, the acoustic loss was too high).

TABLE I

| Absolute Compression of Gel (mils) | Compression Ratio of Gel (%) | Acoustic Loss (dB) | Observation |
|---|---|---|---|
| 1 | 7 | −3 | Leaked water |
| 3 | 21 | −5 | Leaked water |
| 5 | 36 | −5.7 | Sealed |
| 7 | 50 | −6.1 | Sealed |
| 9 | 64 | −5.9 | Sealed |
| 13 | 94 | −6.2 | Sealed |

A silicone gel filled with 5.28 weight % microspheres (corresponding to about 50 volume % microspheres after expansion) was prepared and used in a seal. This gel had a hardness of 100 g (measured on unfilled gel). The groove was 0.8×0.8 mm. The width of the gel body was 0.8 to 0.9 mm before compression. Under compression, the width varied but did not exceed 1.5 mm. The results are provided in Table II below. The lower dB loss of the microsphere filled gel is evident, compared to the filament core embodiment of Example.

TABLE II

| Absolute Compression of Gel (mils) | Compression Ratio of Gel (%) | Acoustic Loss (dB) | Observation |
|---|---|---|---|
| 3 | 13.6 | −0.8 | Leaked water |
| 7 | 31.8 | −1.6 | Sealed |
| 8 | 36.3 | −2.2 | Sealed |
| 9 | 40.9 | −2.5 | Sealed |
| 13 | 59.1 | −3.4 | Sealed |
| 14 | 63.6 | −3.7 | Sealed |

A silicon gel filled with 10.17 weight % microspheres (corresponding approximately to 67 volume % microspheres after expansion) was prepared and used in a seal (same dimensions as for Example 2). This gel had an unfilled hardness of 500 g. The results are provided in Table III below. The even lower dB loss of this microsphere filled gel, compared to that of Example 2, containing a lower microsphere content, is noteworthy. Compared to the filament core design of Example 1, the microsphere filled gel design had a greater sealing range, sealing a bezel-to-touchscreen gap between about 5 mils and 35 mils.

TABLE III

| Absolute Compression of Gel (mils) | Compression Ratio of Gel (%) | Acoustic Loss (dB) | Observation |
|---|---|---|---|
| 17 | 36 | −2.6 | Sealed |
| 27 | 57 | −4.3 | Sealed |

EXAMPLE 4

The microsphere filled silicone gel of Example 3 was tested according to the NEMA 4 procedure. The NEMA 4 test procedure is described in publication no. 250 of the National Electrical Manufacturers Association (Washington, D.C.). Briefly summarizing, this test consists of pointing a fire hose at a touchscreen and pumping 65 gallons per minute of water thereat for 5 min from a distance of ten feet Upon conclusion of spraying, the touchscreen exterior was wiped dry and the touchscreen was electronically tested about 20 minutes after the water was turned off. Strong acoustic signals were immediately detected, indicating that no water had penetrated beyond the seal. This result is particularly noteworthy because the strength of the water blast tends to push in the face of the touchscreen (i.e., increase the separation between the touchscreen and the bezel). Performance results are provided in Table IV.

TABLE IV

| | Average X-Axis Loss (dB) | Maximum X-Axis Loss (dB) | Average Y-Axis Loss (dB) | Maximum Y-Axis Loss (dB) |
|---|---|---|---|---|
| Before Test | −3.34 | −4.34 | −2.96 | −4.35 |
| After Test | −3.63 | −5.84 | −3.02 | −4.35 |

EXAMPLE 5

This example compares the performance of a microsphere-filled gel seal according to this invention against a closed cell polyethylene foam seal not according to this invention.

Two seals for a touchscreen constructed directly on the face of a 17-inch CRT monitor were compared. An organic matrix as described in Rinde, U.S. Pat. No. 5,883,457 (1999) (incorporated herein by reference), was used to prepare the acoustic reflective elements. In one instance, a bezel was lined with 1/32 inch thick×1/8 inch wide closed cell polyethylene foam having pressure sensitive adhesive on one side, to make a foam-based seal. In the second instance, a gel seal according to this invention was made, by first lining the bezel with 1/8 inch 3M Scotch VHB double sided adhesive tape (0.020 inch thick). Over the tape was attached a layer of microsphere filled (10.17 weight %) gel tape 2 mm wide and 0.045 inch thick (making a total thickness of about 0.065 inch, or about twice that of the foam seal), to form a gel seal. The touchscreens were placed horizontally. To simulate spillage of alcoholic beverages (as might occur in a restaurant environment), a 50/50 alcohol water mixture was poured onto to the horizontal touchscreen faces, to a liquid depth of at least 1/4 inch and left standing this way for 1 hr. Although neither touchscreen showed any physical signs of leakage, the signals for the foam seal were noticeably affected, as shown by the results provided in Table V below.

TABLE V

| | Average X-Axis Loss (dB) | Maximum X-Axis Loss (dB) | Average Y-Axis Loss (dB) | Maximum Y-Axis Loss (dB) |
|---|---|---|---|---|
| Polyethylene Foam Seal | | | | |
| Before test | −2.64 | −4.84 | −1.11 | −2.70 |
| Immediately after test | −4.71 | −10.58 | −10.29 | −21.70 |
| 20 min after test | −2.93 | −4.36 | −3.92 | −6.71 |
| Gel Seal | | | | |
| Before test | −1.43 | −3.70 | −1.72 | −5.12 |
| Immediately after test | −1.95 | −3.86 | −2.03 | −5.50 |
| 20 min after test | −1.89 | −3.92 | −1.94 | −5.59 |

The results show that, immediately after the test, the signal loss for a polyethylene seal was high and the touchscreen did not function properly. It was only after a 20 min recovery period (even longer recovery period for Y-Axis) that the signal loss returned to close to the pre-test levels. In contrast, the touchscreen sealed with a gel seal according to this invention had signal losses which were essentially unaffected by the test.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. An acoustic touchscreen arrangement having a seal, comprising:
   (a) an acoustic touchscreen having a touch-sensitive area;
   (b) a housing mounted on the touchscreen, the housing including a bezel located above the touchscreen and around the perimeter of the touch-sensitive area;
   (c) an elongate gel body compressed between the bezel and the touchscreen and forming the seal therebetween around the perimeter of the touch-sensitive area;
   (d) retention means for assisting in the positioning and the holding in place of the elongate gel body; and
   (e) a stop means for limiting the amount of compression of the elongate gel body.

2. An arrangement according to claim 1, wherein the elongate gel body comprises a gel material filled with microspheres.

3. An arrangement according to claim 2, wherein the gel material filled with microspheres is made by heating a precursor composition comprising uncured gel material and unexpanded microspheres at a first temperature to cure the uncured gel material and then heating at a second temperature to expand the unexpanded microspheres.

4. An arrangement according to claim 1, wherein the elongate gel body has a filament core.

5. An arrangement according to claim 1, wherein the elongate gel body comprises a gel material filled with microspheres.

6. An arrangement according to claim 1, wherein the retention means comprises a groove on the face of the bezel facing the touchscreen.

7. An arrangement according to claim 1, wherein the retention means comprises double-sided adhesive tape.

8. An arrangement according to claim 1, wherein the retention means comprises a plurality of projections on the face of the bezel facing the touchscreen and the projections also function as the stop means.

9. An arrangement according to claim 1, wherein the elongate gel body comprises silicone gel.

10. An arrangement according to claim 1, wherein the width of the seal formed is 1 mm or less.

11. An arrangement according to claim 1, wherein the stop means is a projection on the face of the bezel facing the touchscreen.

12. An arrangement according to claim 1, wherein the stop means is a projection on the face of the touchscreen.

13. An arrangement according to claim 1, wherein the stop means comprises a plurality of spacer particles dispersed within the elongate gel body.

14. An arrangement according to claim 1, wherein the touchscreen is a Rayleigh wave touchscreen.

15. An arrangement according to claim 1, wherein the elongate gel body is compressed to a compression ratio of between about 30 and about 70%.

16. An arrangement according to claim 1, wherein the stop means is positioned adjacent to the elongate gel body, with the elongate gel body being positioned between the stop means and the touch-sensitive area.

17. An arrangement according to claim 1, wherein the stop means is positioned between the elongate gel body and the touch-sensitive area and is adjacent to the elongate gel body.

18. A method of sealing an acoustic touchscreen arrangement comprising the steps of:
   (a) providing a touchscreen having a touch-sensitive area;
   (b) mounting a housing having a bezel onto the touchscreen, such that the bezel is located above the touchscreen and around the perimeter of the touch-sensitive area;
   (c) positioning an elongate gel body between the bezel and the touchscreen around the perimeter of the touch-sensitive area such that the elongate gel body is compressed between the bezel and the touchscreen and forms a seal therebetween,
   (d) limiting the amount of compression of the elongate gel body by a stop means; and
   (e) positioning and holding the elongate gel body in place with the assistance of a retention means.

19. A method according to claim 18, wherein the elongate gel body is pre-positioned in the retention means prior to mounting the touchscreen onto the housing.

20. A method according to claim 18, wherein the elongate gel body comprises a gel material filled with microspheres.

21. A method according to claim 20, wherein the gel material filled with microspheres is made by heating a precursor composition comprising uncured gel material and unexpanded microspheres at a first temperature to cure the uncured gel material and then heating at a second temperature to expand the unexpanded microspheres.

22. An acoustic touchscreen arrangement having a seal, comprising:
   (a) an acoustic touchscreen having a touch-sensitive area;
   (b) a housing mounted on the touchscreen, the housing including a bezel located above the touchscreen and around the perimeter of the touch-sensitive area;
   (c) an elongate gel body comprising a filament core and a gel material filled with microspheres and being compressed between the bezel and the touchscreen and forming the seal therebetween around the perimeter of the touch-sensitive area;
   (d) retention means for assisting in the positioning and the holding in place of the elongate gel body; and
   (e) a stop means for limiting the amount of compression of the elongate gel body.

* * * * *